United States Patent

Alexander

[11] Patent Number: 6,142,574
[45] Date of Patent: Nov. 7, 2000

[54] CAR SEAT DIVIDER CONSTRUCTION

[76] Inventor: Margaret T. Alexander, 406 Mahogany Walk, Newtown, Pa. 18940

[21] Appl. No.: 09/383,101

[22] Filed: Aug. 25, 1999

[51] Int. Cl.$^7$ .................................................. A47C 31/00
[52] U.S. Cl. ................. 297/464; 297/188.2; 297/411.24; 297/463.2
[58] Field of Search ............... 297/188.01, 188.14, 297/188.2, 250.1, 256.16, 464, 463.2, 411.24

[56] References Cited

U.S. PATENT DOCUMENTS

| | | | |
|---|---|---|---|
| 4,205,670 | 6/1980 | Owens | 128/134 |
| 4,637,629 | 1/1987 | Cummings | 280/801 |
| 4,938,401 | 7/1990 | Weisbrodt et al. | 224/275 |
| 5,123,707 | 6/1992 | Wurzell | 297/464 |
| 5,255,958 | 10/1993 | Frischmann | 297/250.1 X |
| 5,662,378 | 9/1997 | Carruth | 297/188.18 X |
| 5,685,604 | 11/1997 | Kain | 297/250.1 X |
| 5,820,215 | 10/1998 | Dreisbach | 297/188.2 X |
| 5,845,967 | 12/1998 | Kane et al. | 297/219.12 X |
| 5,911,472 | 6/1999 | Toth | 297/188.2 |
| 5,971,487 | 10/1999 | Passehl | 297/217.1 X |
| 6,015,198 | 1/2000 | Stair | 297/188.01 X |

*Primary Examiner*—Peter R. Brown
*Attorney, Agent, or Firm*—Henderson & Sturm LLP

[57] ABSTRACT

A divider construction 10 for the back seat 101 of a vehicle 100 wherein the construction 10 includes a contoured generally S-shaped divider member 20 having an enlarged upper portion 22 which rests against the seat back 102, a lower portion 23 which extends in front of and below the seat surface 101, and an intermediate portion 24 which rests on top of the rear seat 101. The divider member 20 is provided with a pair of recesses 26 dimensioned to receive beverage receptacles and is further associated with a protective cover member 30 having both external 33 and internal 35 pockets.

17 Claims, 1 Drawing Sheet

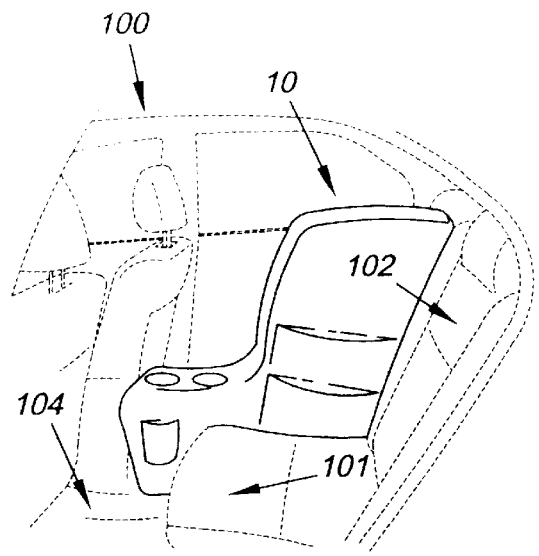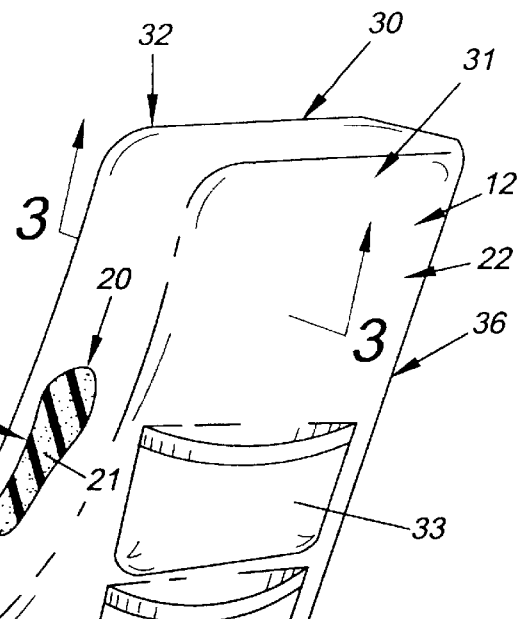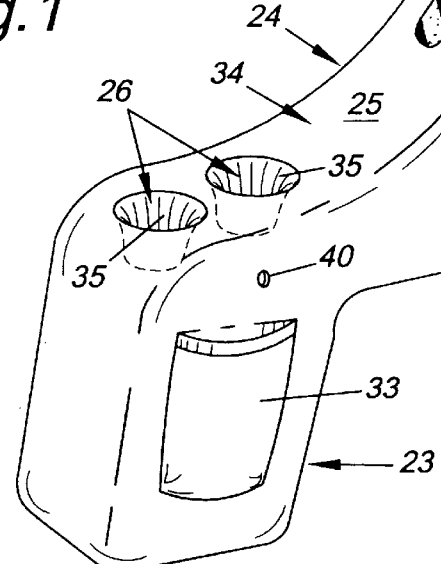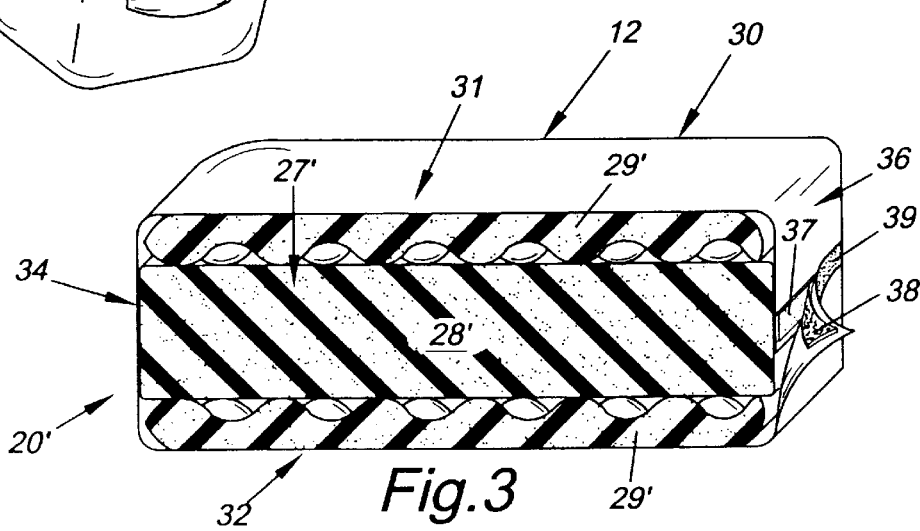
Fig.1
Fig.2
Fig.3

CAR SEAT DIVIDER CONSTRUCTION

BACKGROUND OF THE INVENTION

1. Field of the Invention

The present invention relates to the field of temporary barriers in general, and in particular to a removable divider for the back seat of a vehicle to separate sparring siblings or the like.

2. Description of Related Art

As can be seen by reference to the following U.S. Pat. Nos. 4,205,670; 4,637,629; 4,938,401; 5,123,707; and 5,255,958, the prior art is replete with myriad and diverse car seat restraint and divider constructions.

While all of the aforementioned prior art constructions are more than adequate for the basic purpose and function for which they have been specifically designed, they are uniformly deficient with respect to their failure to provide a simple, efficient, and practical car seat divider that will totally isolate one child from another during long or even short trips when the sibling rivalry between the children reaches the dangerous level such that each child has their own private space and the urge to interact with one another in a negative manner is virtually eliminated.

As most parents with young children are all too painfully aware, young children tend to squabble incessantly with one another when placed in the back seat of a car due to the tendency among siblings and other peer groups for the members of the group to try to establish dominance over one another.

Due to the limited space in the back seat of most vehicles and the need for most individuals, be they young or old to define their own personal space, several relatively unsuccessful attempts have been made in the past to provide partial barriers on the back seat of a vehicle to keep the contentious parties separated from one another to reduce the level of conflict that would otherwise arise absent the barriers.

Unfortunately, these prior art barriers do not afford the degree of separation that is truly required to eliminate conflicts in that the children have no barrier present below the level of the seat and as a result they can still kick at one another in an attempt to annoy or otherwise exhibit dominance over their sibling rival for the affection and/or attention of their parents.

As a consequence of the foregoing situation, there has existed a longstanding need for a new and improved car seat divider that substantially isolates two children from visual and physical contact with one another when properly seat belted into the back seat of a vehicle, and the provision of such a construction is a stated objective of the present invention.

BRIEF SUMMARY OF THE INVENTION

Briefly stated, the car seat divider construction that forms the basis of the present invention comprises in general a contoured and recessed divider unit and a complementary cover unit.

As will be explained in greater detail further on in the specification, the divider unit comprises a generally resilient padded divider member having an upper, lower, and intermediate portions which serve different purposes.

The upper divider member portion eliminates all visual contact between the occupants in the back seat, the intermediate divider member portion provides extremely limited arm contact and virtually no upper leg contact between the two children and the lower divider member portion totally eliminates any lower leg or foot contact between the children.

In addition, the cover unit comprises a removable and washable cover member that conforms to the contours and recesses in the divider unit and contains a plurality of external pockets where the children can store their favorite toys, books, games, etc. to keep them amused during the time that they are confined to the back seat of the car.

BRIEF DESCRIPTION OF THE SEVERAL VIEWS OF THE DRAWINGS

These and other attributes of the invention will become more clear upon a thorough study of the following description of the best mode for carrying out the invention particularly when reviewed in conjunction with the drawings, wherein:

FIG. 1 is a perspective view of the divider construction installed in the back seat of a vehicle;

FIG. 2 is an isolated perspective view of the divider construction; and

FIG. 3 is a cross sectional view taken through line 3—3 of FIG. 2.

DETAILED DESCRIPTION OF THE INVENTION

As can be seen by reference to the drawings, and in particular to FIG. 1, the car seat divider construction that forms the basis of the present invention is designated generally by the reference number 10. As shown in FIGS. 2 and 3, the construction 10 comprises an internal divider unit 11, and an external cover unit 12. These units will now be described in seriatim fashion.

In the preferred embodiment of this invention, the divider unit 11 comprises a contoured divider member 20 fabricated from a single block of generally rigid, yet resilient material 21 such as foam rubber or the like. The contoured divider member 20 has an enlarged generally rectangular upper portion 22, a somewhat smaller generally rectangular lower portion 23 and a generally tapered intermediate portion 24.

As can best be seen by reference to FIG. 2, all of the external surfaces of the divider member 20 are generally planar with the exception of the curved transition zone designated generally as 25 which is formed on the upper surface of the intermediate portion 24 of the divider member 20.

In addition, the upper surface of the lower divider member portion 23 is provided with a plurality of recesses 26 which are dimensioned to receive beverage receptacles (not shown) in a well recognized manner.

Still referring to FIG. 2, it can be seen that the divider member 20 has a generally S-shaped configuration. The longitudinal axes of both the upper 22 and lower 23 portions of the divider member 20 are aligned in a generally vertical orientation, the longitudinal axis of the intermediate portion 24 is aligned in a generally horizontal orientation and the narrowest portion on the side profile of the divider member 20 occurs at the juncture of the intermediate portion 24 with the lower portion 23 of the divider member 20.

As shown in FIGS. 1 through 3, the cover unit 12 comprises a contoured removable and washable cover member 30 which closely conforms to the external periphery of the divider member 20. Each of the side panels 31, 32 of the cover member 30 are provided with a plurality of external pockets 33 preferably positioned adjacent the upper 22 and lower 23 portions of the divider member 20. The upper front panel 34 of the cover member is provided with internal pockets 35 which are dimensioned to be received in the recesses 26 formed in the divider member 20 as mentioned previously.

Turning now to FIG. 3, it can be seen that the rear panel 36 of the cover member 30 is slit wherein each of the panel halves are provided with cooperating hook and loop fasteners 37, 38 and the exterior of the rear panel 36 is optionally provided with a conventional fastening element 39 that can be employed to temporarily affix the divider construction 10 to the seat 101 and seat back 102 surfaces of the rear seat of a vehicle.

Still referring to FIG. 3, it can be seen that in an alternate version of the preferred embodiment, the divider member 20' comprises a central core 27' of generally lightweight rigid material 28' such as Styrofoam or the like which is sandwiched between two generally resilient layers 29' fabricated from foam rubber or the like. The generally rigid central core 27' provides rigidity and support to the construction 10, and helps to maintain the construction in the upright position illustrated in FIGS. 1 and 2 when the lower portion 23 of the construction 10 is wedged into the foot well between the front and rear seats of the vehicle.

As can best be seen by reference to FIG. 2, the construction 10 also contemplates the provision of electrical ports being provided on the opposite sides of the divider member 20 and extending through the cover member 30 whereby the children could plug in computer games and other devices on each side of the construction to keep the children amused.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. A divider construction for temporary installation on the back seat of a car to separate young children from one another wherein the construction comprises:

a divider unit including a contoured divider member having an upper portion adapted to engage the seat back portion of the back seat, and project outwardly therefrom, an intermediate portion which rests on top of the seat and a lower portion which extends downwardly from the intermediate portion and outwardly relative to the lower portion of the back seat, wherein the lower portion of the divider member is provided with a pair of recesses dimensioned to receive beverage receptacles.

2. The construction as in claim 1 wherein the upper portion of the divider member has an enlarged generally rectangular configuration and the lower portion of the divider member has a somewhat smaller rectangular configuration.

3. The construction as in claim 2 wherein the intermediate portion of the divider member has a generally tapered configuration.

4. The construction as in claim 1 wherein a portion of the divider member is provided with a pair of recesses dimensioned to receive beverage receptacles.

5. The construction as in claim 1 wherein the divider member has opposed sides which are provided with means for storing diverse articles.

6. The construction as in claim 1 further comprising:

a cover unit including a protective cover member dimensioned to closely conform to said contoured divider member.

7. The construction as in claim 6 wherein said cover member is provided with a plurality of external pockets on the opposite sides of the divider member.

8. The construction as in claim 7 wherein the divider member is provided with a pair of recesses dimensioned to receive beverage receptacles, and the cover member is provided with a pair of internal pockets dimensioned to be received in the recesses.

9. The construction as in claim 6 wherein the divider member comprises a central core of lightweight yet rigid material.

10. The construction as in claim 9 wherein the central core has opposed sides wherein each side is provided with a resilient layer.

11. The construction as in claim 1 wherein the divider member is fabricated from a single block of generally rigid yet resilient material.

12. A divider construction for temporary installation between the back seat and the front seat of a car to separate young children from one another wherein the construction comprises:

a divider unit including a generally uniform thickness contoured divider member having an upper portion adapted to engage the seat back portion of the back seat, and project outwardly therefrom, a generally tapered intermediate portion which rests on top of the back seat and a lower portion which extends downwardly from the intermediate portion and a substantial distance outwardly relative to the lower portion of the back seat and in the direction of the front seat, and wherein the divider member is fabricated from a single block of generally rigid yet resilient material.

13. The construction as in claim 12 wherein the lower portion of the divider member is provided with a pair of recesses dimensioned to receive beverage receptacles.

14. The construction as in claim 12 wherein the divider member has opposed sides which are provided with means for storing diverse articles.

15. The construction as in claim 12 further comprising:

a cover unit including a protective cover member dimensioned to closely conform to said contoured divider member.

16. The construction as in claim 15 wherein said cover member is provided with a plurality of external pockets on the opposite sides of the divider member.

17. The construction as in claim 16 wherein the divider member is provided with a pair of recesses dimensioned to receive beverage receptacles, and the cover member is provided with a pair of internal pockets dimensioned to be received in the recesses.

* * * * *